Figure 1:
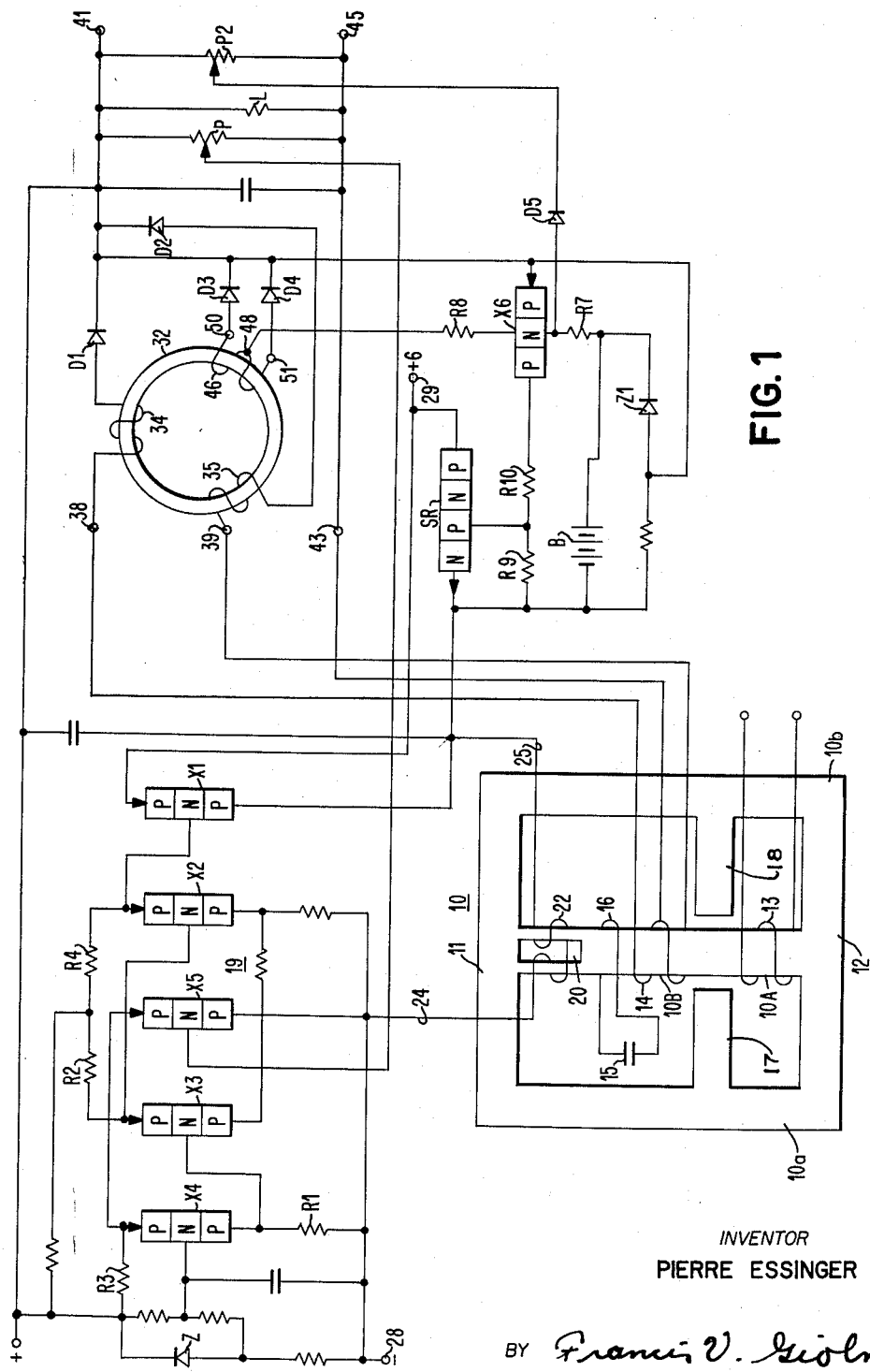

Jan. 7, 1964 P. ESSINGER 3,117,274
POWER SUPPLY WITH PROTECTIVE CIRCUITS
Filed July 29, 1960 2 Sheets-Sheet 1

INVENTOR
PIERRE ESSINGER
BY Francis V. Giolma
ATTORNEY

United States Patent Office 3,117,274
Patented Jan. 7, 1964

3,117,274
POWER SUPPLY WITH PROTECTIVE CIRCUITS
Pierre Essinger, Yorktown Heights, N.Y., assignor to International Business Machines Corporation, New York, N.Y., a corporation of New York
Filed July 29, 1960, Ser. No. 46,251
7 Claims. (Cl. 323—56)

This invention relates generally to power supplies, and it has reference in particular to a power supply having integral protective circuits therein.

Generally stated, it is an object of this invention to provide in a transformer type power supply for controlling the flux linkages between input and output windings to protect against an abnormal circuit condition, such as an overcurrent or overvoltage.

More specifically, it is an object of this invention to provide for utilizing a local control flux in a magnetic core to reduce the output voltage of a transformer to substantially zero upon the occurrence of an abnormal condition.

One object of the present invention is to utilize a figure-8 control winding in a transformer with or without ferroresonant effect for reducing the secondary voltage of the transformer in response to an overcurrent condition.

Another object of this invention is to provide for using a voltage responsive signal for reducing the output voltage of a ferroresonant transformer in the event of a sudden overvoltage condition.

It is also an object of this invention to provide for using a signal from a current sensing device to operate a trigger device for knocking the output voltage of a regulating transformer down to substantially zero so as to prevent damage to a load device from an overcurrent condition.

The foregoing and other objects, features and advantages of the invention will be apparent from the following more particular description of preferred embodiments of the invention, as illustrated in the accompanying drawings.

In the drawings:

FIG. 1 provides a schematic diagram of a ferroresonant regulated power supply embodying the invention in one of its forms.

Figure 2:
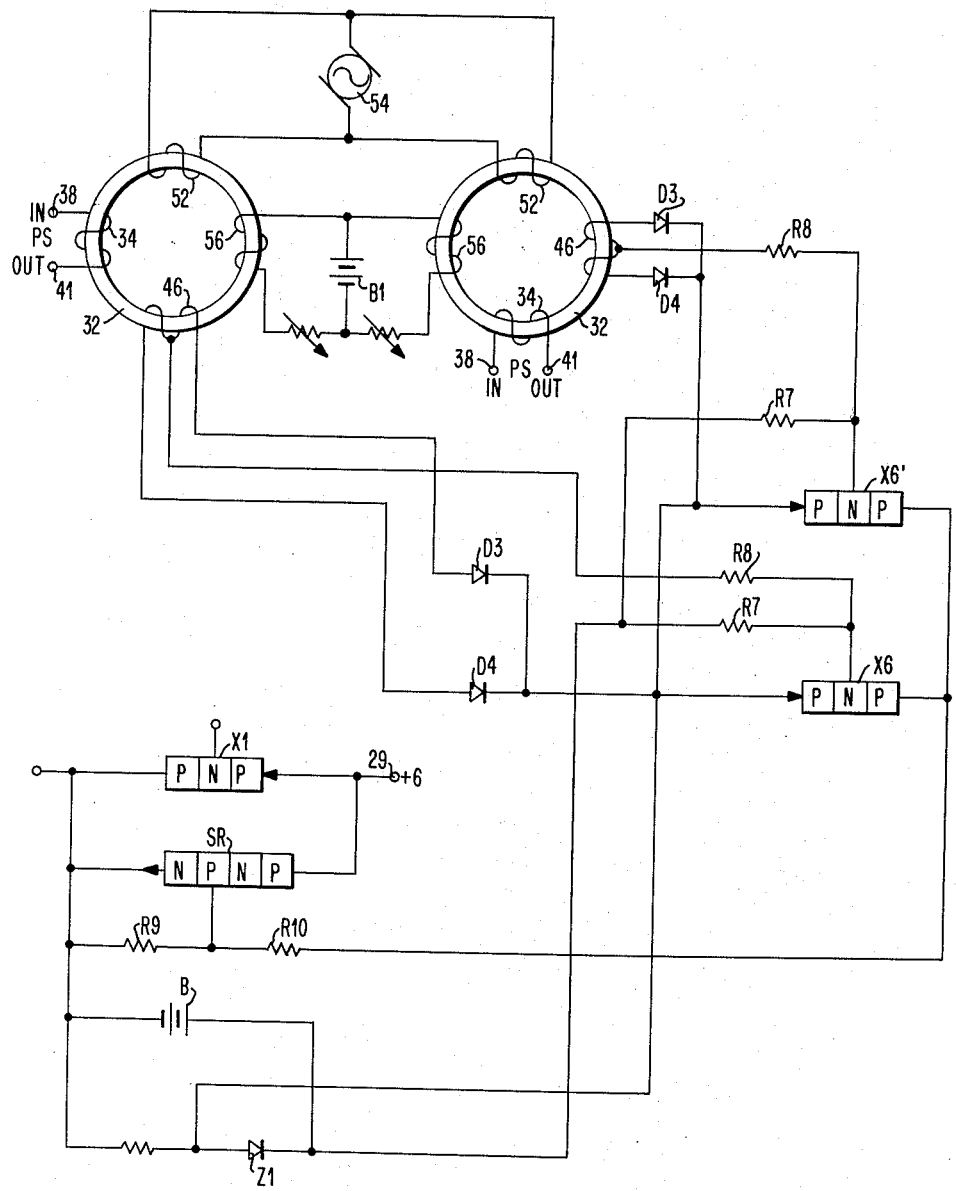

FIG. 2 is a schematic diagram showing the invention in another of its forms as applied to the control of multiple loads.

Referring particularly to FIG. 1 of the drawings, the reference numeral 10 denotes generally a transformer, and in this particular instance, a ferroresonant transformer and its regulating circuit 19, which may be similar to that described in the copending application of Orestes M. Baycura et al., Serial No. 861,840, entitled Transducer Regulating Means, filed on December 24, 1959, and assigned to the assignee of the present invention. As set forth in this copending application, the transformer 10 comprises a three-legged core having outside legs 10a and 10b together with a central leg having primary and secondary winding portions 10A and 10B, all legs being connected by end portions 11 and 12. A primary winding 13 is positioned on the primary portion of the core 10A and is arranged to be connected to a suitable source of alternating current while a secondary winding 14 for supplying a load circuit L is positioned on the secondary portion of the core 10B and is provided with a center tap. A capacitor 15 is connected to a separate winding 16 also positioned on the secondary portion of the core 10B for producing a ferroresonant condition in accordance with the teachings of the Sola Patent 2,143,745 which issued on January 10, 1939, to Joseph G. Sola, entitled Constant Potential Transformer. Magnetic shunt portions 17 and 18 connected to the outer legs 10a and 10b are disposed between the primary and secondary windings 13 and 14 to provide a shunt magnetic circuit for secondary magnetic leakage flux.

As set forth in the Baycura et al. application hereinbefore referred to, improved regulation of the transformer 10 is provided by utilizing a control winding 22 which is threaded through a hole or slot 20 in the secondary portion of the core 10B so as to provide an effective figure-8 winding for controlling local saturation in the core portion 10B about the slot 20. This winding is connected by means of conductors 24 and 25 to a direct current source represented by the terminals 28 and 29 by means of control circuit 19. This control circuit includes a transistor X1 which is connected in series with the control winding 22 and the source terminals 28 and 29. The bias of the transistor X1 is controlled by means of amplifier transistors X3 and X2 which control the current through resistors R2 and R4, respectively. The conductivity of the transistor X3 is controlled by a pair of transistors X4 and X5 which are connected in conjunction with resistors R1 and R3 to provide a differential amplifier. The base of the transistor X4 is connected to obtain a fixed reference bias from a Zener diode Z and the transistor X4 is utilized to vary the current through resistor R1 for controlling the conductivity of amplifier transistor X3. By connecting a potentiometer P between terminals 41 and 45, or across the output or load circuit L of the transformer 10 to the base of the transistor X5, variations in the load voltage from the fixed reference provided by the Zener diode Z may be utilized to control the conductivity of the control winding 22, the local saturation of leg 10B and hence the flux linkages between the primary and secondary windings. The output voltage of the transformer 10 is thereby controlled so as to regulate its output voltage.

In accordance with the teachings of this invention, the energization of the control winding 22 is further controlled by any suitable trigger device, such as, a thyratron, a latch device or a silicon controlled rectifier SR, which is in effect connected across the power amplifier transistor X1 so as to shunt it out of the circuit and obtain maximum energization of the control winding 22 to thereby produce maximum saturation about the opening 20, and thus drop the output voltage of the secondary winding 14 to substantially zero. In order to provide for controlling the rectifier SR, a control transistor X6 is utilized. A battery B and Zener diode Z1 provide a normal back bias to turn transistor X6 off. To turn it on, a magnetic core 32 is provided having input windings 34 and 35 which are connected in circuit with the opposite terminals 38 and 39 of the secondary windings 14. These windings are connected through diodes D1 and D2 to the positive terminal 41 of the load circuit. Terminal 43 connected to the center tap of the secondary winding 14 provides the negative side of the load circuit L which is connected to terminal 45. The load circuit L is indicated as connected between the terminals 41 and 45 and represents any suitable type of load. The core 32, which functions like a current transformer, is provided with an output winding 46 having a center tap 48 which is connected to the base of transistor X6 through a resistor R8. Opposite terminals 50 and 51 of the winding 46 are connected through diodes D3, D4 to the emitter of the transistor X6. The core and windings function as a current transformer in response to the pulses passed by the diodes D1, D2 so that any increase in current through the winding 34 or 35 over a given value will produce a pulse voltage in the winding 46 such as to drive the base of the transistor X6 negative enough for conduction. This transistor is very sensitive to any voltage more negative than the emitter voltage and a voltage smaller than one volt is enough to saturate the transistor. Zener diode Z1 and resistors R7 and R8 utilize to normally hold the emitter below the value of the base bias and permit a voltage induced in the winding 46 to overcome this condition and drive the transistor X6 to conduct. Conductivity of the transistor X6 changes the bias of the controlled rectifier SR in response to current through the resistors R9 and R10 from battery B so as to render the rectifier conductive and shunt out the series amplifier transistor X1. This forces the maximum control current through the control winding 22 and effectively drives the secondary voltage to substantially zero.

A potentiometer P2 is connected across the load circuit L and is connected through a diode D5 to the base of transistor X6 so as to sense any overvoltage condition for which the potentiometer P2 may be adjusted. When the voltage between terminals 41, 45 exceeds a predetermined value, the back biasing effect of Zener diode Z1 is overcome, and the voltage of the load circuit forward biases transistor X6 which then triggers the controlled rectifier SR and shunts amplifier transistor X1 to force the voltage from the secondary winding 14 to zero.

Referring to FIG. 2, an application of the invention is shown for controlling a single power supply supplying multiple loads. In this embodiment the transistor X1 which controls the conductivity of the control winding 22 on the transformer 10 is shown shunted by a silicon controlled rectifier SR which is in turn selectively controlled by either one or both of a pair of control resistors X6, X6′. The transistor X6 is shown as controlled through base resistors R7 and R8 and diodes D3, D4 by the output voltage from a winding 46 on a magnetic core 32 having an input or load circuit winding 34 with an input terminal 38 coming from a power supply, such as shown in connection with the circuit of FIG. 1 and an output terminal 41 disposed to be connected to the load circuit. An additional magnetic core 32 is also provided having an output winding 46 connected through similar diodes D3, D4 to control the conductivity of a similar control transistor X6′ in conjunction with similar resistors R7, R8. This additional magnetic core is likewise provided with an input winding 34 having an input terminal 38 and an output terminal 41 disposed to be connected to an additional load circuit.

Each of the cores 32 is provided with an alternating current control winding 52 which may be connected to an alternating current source 54, either of sixty cycles or a high frequency if desired. In order to normally prevent coupling between the windings 52 and 46, bias windings 56 are provided on each of the cores which are connected to a direct current source, such as a battery B1 or an in-phase A.C. current, for producing a saturating flux in the cores to limit mutual inductance between the windings 52 and 46. The windings 34 are so connected as to produce a flux in the core 32 to oppose the bias flux produced by the windings 56.

Under normal conditions, the transistor X1 will be controlled by its regulating circuit as described in connection with the invention shown in the system of FIG. 1. For normal load conditions, the magnetic cores 32 will be saturated by the bias windings 56 so that practically no flux linkage exists between the alternating current windings 52 and the output windings 46. Should the currrent in either of the load circuits exceed the rate amount, sufficient flux will be produced in the cores 32 by windings 34 to offset the flux produced by the bias windings 56 so that inductive coupling exists between the windings 52 and 46. The voltages induced in the windings 46 will be large enough to offset the bias of transistor X6 and drive it to a conductive mode. This in turn turns on the silicon controlled rectifier SR, which shunts the power amplifier transistor X1 and drives the conductivity of the control winding 22 to a maximum, thereby reducing the output voltage of the transformer 10 to a minimum.

While the invention has been described principally in connection with an overcurrent detector and an overvoltage sensing circuit, it will be realized that other electrical conditions may be utilized to effect operation of the control transistors to trigger the silicon controlled rectifier in response to other circuit conditions as well. By utilizing a control winding of this nature, the output voltage of the regulating transformer may be quickly and easily dropped to substantially zero so as to limit the current and voltage applied to the load without having to open the circuit so that the invention provides a simple and effective manner for limiting the current and voltage in the regulating circuit as well as in the load circuit.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In combination, a ferroresonant transformer having a magnetic core with adjacent primary and secondary portions with primary and secondary windings thereon separated by magnetic shunt means and having an opening in said secondary portion, a resonant circuit including a capacitor and a portion of the secondary winding, a control windings passing through said opening for producing a local control flux about the periphery of the opening, circuit means connected to effect energization of the control winding in accordance with the voltage of the secondary winding to regulate said voltage and additional circuit means connected in circuit with the secondary winding and the control winding for effecting energization of the control winding independently of the aforesaid circuit means to substantially immediately de-energize the secondary winding in response to an abnormal circuit condition of the secondary winding.

2. The combination with a ferroresonant transformer having a magnetic core with primary and secondary portions having primary and secondary windings thereon for supplying alternating current to a load circuit, said core having a magnetic shunt between said windings and having an opening in a portion of said secondary core portion, of a saturable control winding positioned in said opening for producing a magnetic control flux about the periphery of the opening only, control circuit means connecting the load circuit and said control winding to regulate the voltage at the load circuit and additional circuit means including a trigger circuit connected for applying a control signal to the control winding to abruptly drop the voltage of the secondary winding to substantially zero in response to a predetermined abnormal circuit condition of the load circuit.

3. In combination, a ferroresonant transformer having a magnetic core with primary and secondary portions separated by a magnetic shunt and having primary and secondary windings for connecting a load circuit to a source of alternating current, said secondary core portion having a hole therethrough, a figure-8 control winding threaded through the opening for producing a peripheral control flux, circuit means connected for effecting energization of the control winding in accordance with the voltage of the load circuit to maintain said voltage substantially constant and means including a magnetic core inductively coupled with the load circuit for applying a signal to the control winding for suddenly reducing the voltage of the secondary winding to substantially zero in response to greater than a predetermined value of load current.

4. In combination, a ferroresonant transformer comprising a magnetic core having a plurality of windings including primary and secondary windings for supplying alternating current to a load circuit and having a high leakage path for magnetic flux to thread one of the windings and not the other, said core having a hole through one portion thereof and said transformer having a resonant circuit including a capacitor connected in circuit with one of said plurality of windings, a figure-8 control winding threaded through the opening in the core, circuit means connected to energize the control winding to regulate the load circuit voltage means including a magnetic core having one winding connected in circuit with the load circuit and an additional winding, and trigger means controlled by said additional winding connected for effecting energization of the control winding to abruptly limit the voltage of the secondary winding.

5. The combination with a ferroresonant transformer having primary and secondary windings for supplying alternating current to a load circuit, said windings being disposed in inductive relation on a magnetic core having a high leakage path for magnetic flux to thread through one winding and not the other, said core having an opening in a portion providing a path for flux threading the secondary winding and said transformer having a resonant circuit including a capacitor connected to a portion of said secondary winding, means including a magnetic core having one winding connected in series with the load circuit and a control winding inductively coupled therewith, means including a trigger circuit having a controlled rectifier connected to the control winding, a figure-8 control winding threaded through the opening in the core connected to be energized by the controlled rectifier, and regulating means including circuit means connecting the load circuit and said control winding to regulate the voltage of the load circuit.

6. In combination, a transformer having a magnetic core with inductively related primary and secondary windings thereon for supplying alternating current to a load circuit and having means including a magnetic shunt located between said windings, said core having an opening through a portion of the core, a figure-8 control winding threaded through said opening for controlling flux linkages between the primary and secondary windings, circuit means connected between the load circuit and the control winding for regulating the voltage of the secondary winding within a normal range, a trigger circuit including a controlled rectifier connected to energize the control winding and abruptly reduce the voltage of the secondary winding, and means responsive only to an abnormal condition of the load circuit beyond said normal range for applying a control signal to the controlled rectifier to override the operation of said circuit means.

7. The combination with a ferroresonant constant potential transformer having a magnetic core with primary and secondary core portions separated by a magnetic shunt and having primary and secondary windings thereon with a resonant circuit including a capacitor associated with one of said windings, said core having an opening through a secondary portion of the core, a figure-8 control winding threaded through said opening for producing a local control flux about the opening to reduce the flux linkages between the primary and secondary windings, circuit means connected to effect energization of the control winding in accordance with the secondary voltage to regulate said voltage, means responsive to an abnormal condition in the load circuit for producing a control signal, and trigger means controlled by the control signal for effecting energization of the control winding independently of said circuit means to abruptly reduce the voltage of the secondary winding to substantially zero.

References Cited in the file of this patent

UNITED STATES PATENTS

| | | |
|---|---|---|
| 2,143,745 | Sola | Jan. 10, 1939 |
| 2,253,705 | Hedding | Aug. 26, 1941 |
| 2,843,215 | Streuber | July 15, 1958 |
| 2,904,743 | McClain | Sept. 15, 1959 |

FOREIGN PATENTS

| | | |
|---|---|---|
| 982,502 | France | Jan. 21, 1952 |

UNITED STATES PATENT OFFICE
CERTIFICATE OF CORRECTION

Patent No. 3,117,274 January 7, 1964

Pierre Essinger

It is hereby certified that error appears in the above numbered patent requiring correction and that the said Letters Patent should read as corrected below.

Column 4, line 24, for "windings" read -- winding --; column 6, line 37, for "982,502" read -- 998,502 --.

Signed and sealed this 28th day of April 1964.

(SEAL)
Attest:
ERNEST W. SWIDER

Attesting Officer

EDWARD J. BRENNER
Commissioner of Patents